(No Model.)
C. MENDENHALL.
STOCK FEEDER.
No. 280,208. Patented June 26, 1883.
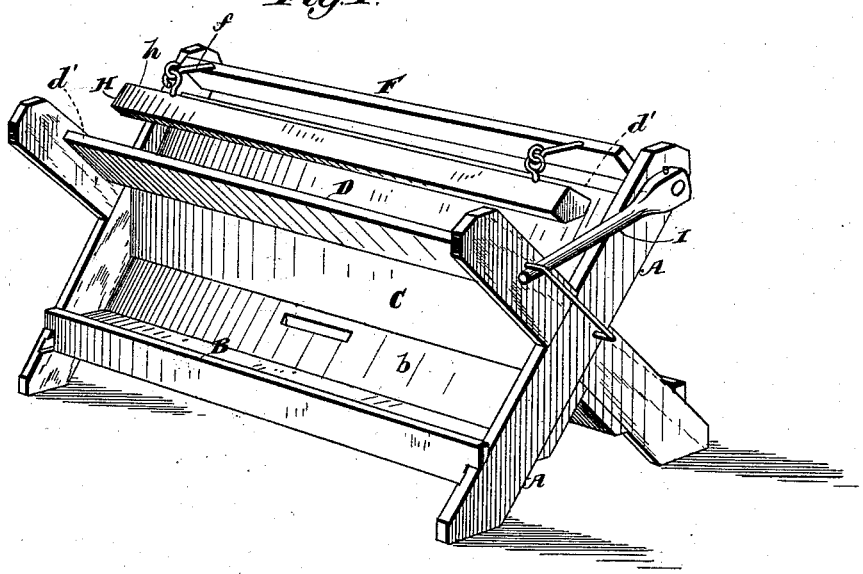
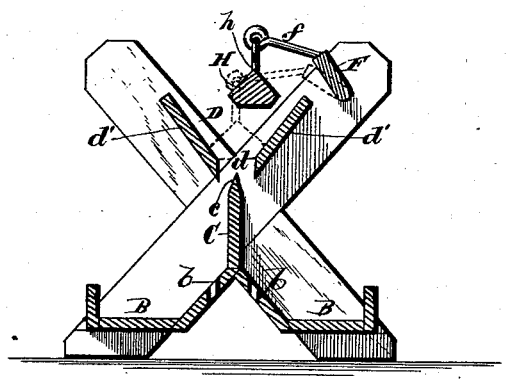
Witnesses.
Robert Everett,
J. A. Rutherford
Inventor.
Clarkson Mendenhall,
By James L. Norris,
Atty.

UNITED STATES PATENT OFFICE.

CLARKSON MENDENHALL, OF MENDENHALL, PENNSYLVANIA.

STOCK-FEEDER.

SPECIFICATION forming part of Letters Patent No. 280,208, dated June 26, 1883.

Application filed March 15, 1883. (No model.)

*To all whom it may concern:*

Be it known that I, CLARKSON MENDENHALL, a citizen of the United States, residing at Mendenhall, in the county of Chester and State of Pennsylvania, have invented new and useful Improvements in Stock-Feeders, of which the following is a specification.

My invention relates to a feeding device for sheep, hogs, or other cattle; and the novelty consists in the construction and arrangement of parts, as will be more fully hereinafter set forth, and specifically pointed out in the claims.

The object of this invention is to produce a feeding device which shall be simple and cheap of construction, efficient and reliable in service—one which shall insure a gradual and even feed along the feeding-trough upon either or both of two sides; and to these ends the invention consists, essentially, in the mechanism fully illustrated in the accompanying drawings, which form a part of this specification, and in which—

Figure 1 is a perspective view with the longitudinal valve open, and Fig. 2 a transverse section of my device.

The device is of especial importance and usefulness in feeding swine or sheep, where the animals ravenously crowd each other for places, and where the smaller and younger animals are liable to be deprived of their share, as, it being understood that sufficient trough-room is provided for the number of animals to be fed, this device will deposit along the entire trough-space at the same time, in uniform quantities, the food, and thus the necessity for and liability of crowding and fighting is obviated.

Referring to the drawings, A A designate timber-pieces crossing each other at proper angles, as shown, and secured together at their points of juncture, below which points, upon either side, is formed a trough, B. These parallel troughs B are each provided with a back portion, b, which assumes the angle of the end pieces, A, and prevents an abrupt angle, in which the food might collect, out of reach of the animals.

Between the two troughs B is a division-board, C, which occupies a central longitudinal position in the device, and it is provided with a beveled upper edge, c, which edge projects up within the mouth d of the reservoir D, formed by the inclined boards d', the edge c standing in the longitudinal center of said mouth.

Journaled in the upper ends of two of the timbers A, the said two being on the same side of the device, is a rock-shaft, F, having arms f, from which arms is suspended a longitudinal valve, H, so formed as to make a close joint against each of the boards d' and have a sharp central edge, h, on its upper surface.

To one end of the rock-shaft F is secured a handle or lever, I, operating in a guide, and by means of this lever I the valve may be elevated from the mouth of the reservoir, said valve gravitating into position as soon as the force is taken from the lever.

It will be observed that the edge h will deflect the grain or other food equally to each side of the reservoir; that the valve will open the mouth of the reservoir for its entire length at the same instant; that the board C will further divide it equally between the troughs B, and also that said board will prevent the animals from seeing each other when eating.

The device may be portable, of any desired size, may be made in sections, and elevated, if desired.

I am aware of Letters Patent No. 208,544, and do not wish to be understood as claiming anything therein shown and described.

Having thus described my invention, what I claim is—

1. In a feeding device composed of the two divided troughs having inclined backs, and a division-board which occupies a central position in the mouth of a food-reservoir, a suspended longitudinal valve having a central upper edge, and means for elevating it away from the said mouth and lowering it to close the said mouth, as described.

2. The feeding device herein described, consisting of the timbers A A and troughs B B, having inclined backs b, the division-board C, having beveled edge c, the reservoir D, rock-shaft F, having arms f, valve H, having central upper edge, h, and the lever I, all constructed, combined, and arranged to operate as and for the purposes set forth.

In testimony whereof I have hereunto set my hand in the presence of two subscribing witnesses.

CLARKSON MENDENHALL.

Witnesses:
A. A. PYLE,
THOS. T. WORRALL.